(12) United States Patent
Estes et al.

(10) Patent No.: US 10,378,330 B2
(45) Date of Patent: Aug. 13, 2019

(54) EXTENDING THE RANGE OF A MEMS GYROSCOPE USING ECCENTRIC ACCELEROMETERS

(71) Applicants: Robert A. Estes, Tomball, TX (US); Randell R. Riggs, Richards, TX (US)

(72) Inventors: Robert A. Estes, Tomball, TX (US); Randell R. Riggs, Richards, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 131 days.

(21) Appl. No.: 15/388,674

(22) Filed: Dec. 22, 2016

(65) Prior Publication Data

US 2018/0180418 A1 Jun. 28, 2018

(51) Int. Cl.
*E21B 44/00* (2006.01)
*G01C 19/5712* (2012.01)
*E21B 49/00* (2006.01)

(52) U.S. Cl.
CPC .......... *E21B 44/00* (2013.01); *E21B 49/003* (2013.01); *G01C 19/5712* (2013.01)

(58) Field of Classification Search
CPC ..... G01C 19/5712; G01C 25/00; E21B 44/00; E21B 7/04; E21B 49/003; G01P 15/0802
See application file for complete search history.

(56) References Cited

U.S. PATENT DOCUMENTS

| | | | | |
|---|---|---|---|---|
| 5,432,699 A * | 7/1995 | Hache | ........ | E21B 47/022 702/9 |
| 6,347,282 B2 * | 2/2002 | Estes | ........ | E21B 47/022 702/6 |
| 6,529,834 B1 * | 3/2003 | Estes | ........ | E21B 47/022 702/9 |
| 7,000,700 B2 * | 2/2006 | Cairns | ........ | E21B 44/00 166/255.2 |
| 7,114,565 B2 * | 10/2006 | Estes | ........ | E21B 44/00 166/255.2 |
| 7,813,878 B2 * | 10/2010 | Estes | ........ | G01C 19/00 702/11 |
| 8,374,793 B2 * | 2/2013 | Ekseth | ........ | E21B 47/022 702/150 |
| 9,464,519 B2 * | 10/2016 | Liu | ........ | E21B 7/04 |
| 9,863,783 B1 * | 1/2018 | Ledroz | ........ | E21B 47/022 |
| 2009/0314546 A1 * | 12/2009 | Mintchev | ........ | E21B 7/04 175/45 |

(Continued)

OTHER PUBLICATIONS

PCT International Search Report and Written Opinion; International Application No. PCT/US2017/067776; International Filing Date: Dec. 21, 2017; dated Apr. 17, 2018; pp. 1-12.

*Primary Examiner* — Michael R Wills, III
(74) *Attorney, Agent, or Firm* — Cantor Colburn LLP (57) ABSTRACT

A tool for use in a borehole penetrating a formation method and a method for using the tool is disclosed. The tool includes a gyroscope for obtaining a first measurement of a rotation rate of the apparatus and at least one accelerometer for obtaining a second measurement of the rotation rate of the apparatus. A processor generates an estimate of the rotation rate using at least one of the first measurement of rotation rate and the second measurement of rotation rate. The estimate of the rotation rate is sued to determine a rotational position of a formation parameter measurement obtained during rotation of the apparatus in the borehole.

16 Claims, 6 Drawing Sheets

(56) References Cited

U.S. PATENT DOCUMENTS

2011/0015862 A1* 1/2011 Sato ................. E21B 47/022
702/6
2016/0177704 A1* 6/2016 Van Steenwyk ...... E21B 47/024
166/255.2

* cited by examiner

EXTENDING THE RANGE OF A MEMS GYROSCOPE USING ECCENTRIC ACCELEROMETERS

BACKGROUND

The present invention discloses a method and apparatus for measuring a rotation rate of a downhole tool and, in particular, a method and apparatus for extending a measurement range of a gyroscope used to obtain a rotation rate of the drill tool.

In petroleum exploration, a borehole is formed in the earth in order to reach a hydrocarbon-bearing reservoir by rotating a drill bit at a bottom end of a drill string disposed in the borehole. Formation evaluations sensors on the drill string are used to obtain parameter measurements, e.g., resistivity, porosity, acoustic measurements, etc., which are then used to determine the nature of the formation surrounding the drill string and to help steer the drill string toward the reservoir. Formation parameter measurements are often obtained while the drill string is rotating and the tool face angle is varying rapidly. Therefore, for directionally-sensitive measurements, knowing the tool face angle of the drill string is useful. In many instances, the tool face angle can be calculated from an arctangent function of a two-axis magnetometer, with its X and Y axes perpendicular to the long (Z) axis of the drill string. This method is computationally intensive. The tool face angle can also be determined by integrating measurements of instantaneous rotation rate of the drill string. The instantaneous rotation rate is often measured using a gyroscope oriented such that its sensitive axis measures rotation around an axis parallel to the drill string. However, the gyroscope is reliable only for rotation rates within a certain range. When the drill string rotates at a rate outside of this range, as often happens during stick-slip conditions on the drill string, the gyroscope measurements may provide a poor measurement of the true rotation rate and produce errors in subsequent computations, such as a poor estimation of tool face angle, leading to a poor angular alignment of formation parameter measurements or to an erroreous correction for an antenna that is sensitive to rotation rate.

BRIEF DESCRIPTION

In one aspect, the present invention provides a method of using a tool in a borehole penetrating a formation, the method including: using a gyroscope disposed on the tool to obtain a first measurement of rotation rate of the tool; using at least one accelerometer disposed on the tool to obtain a second measurement of rotation rate of the tool; and using a processor to: generate an estimate of the rotation rate of the tool using at least one of the first measurement of rotation rate and the second measurement of rotation rate, and use the estimate of the rotation rate to determine a rotational position of a formation parameter measurement obtained during rotation of the tool.

In another aspect, the present invention provides an apparatus for use in a borehole, the apparatus including: a gyroscope for obtaining a first measurement of a rotation rate of the apparatus; at least one accelerometer for obtaining a second measurement of the rotation rate of the apparatus; and a processor configured to: generate an estimate of the rotation rate using at least one of the first measurement of rotation rate and the second measurement of rotation rate, and use the estimate of the rotation rate to determine a rotational position of a formation parameter measurement obtained during rotation of the apparatus in the borehole.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
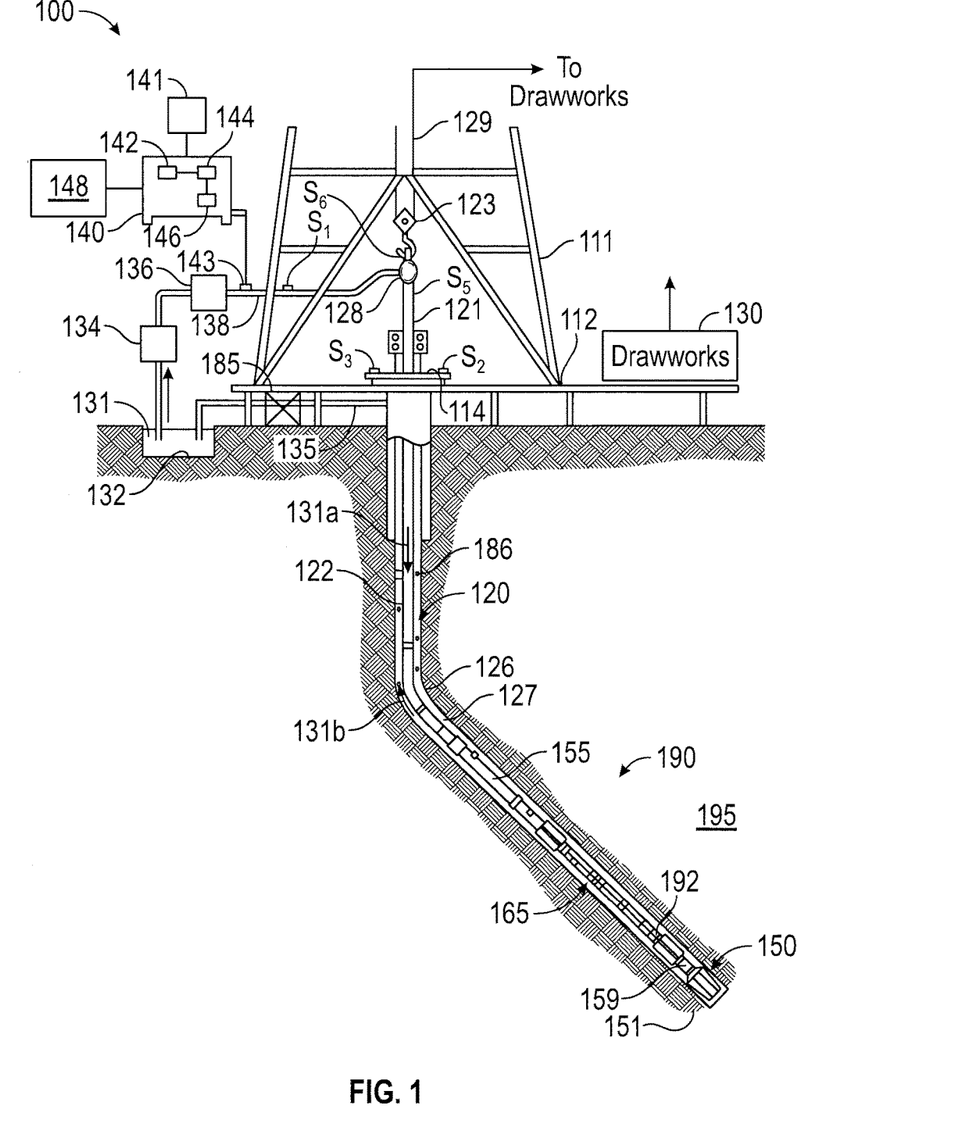
FIG. 1 is a schematic diagram of an exemplary drilling system that includes a drill string having a drilling assembly attached to its bottom end that includes a steering unit according to one embodiment of the disclosure.

Referring to FIG. 1, is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly ("BHA") 190 conveyed in a borehole 126, also referred to herein as a well or wellbore. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190 attached at its bottom end, extends from the surface to the bottom 151 of the borehole 126. A drill bit 150, attached to drilling assembly 190, disintegrates the geological formations when it is rotated to drill the borehole 126. The drill string 120 is coupled to a draw-works 130 via a Kelly joint 121, swivel 128 and line 129 through a pulley. Draw-works 130 is operated to control the weight on bit ("WOB"). The drill string 120 may be rotated by a top drive (not shown) instead of by the prime mover and the rotary table 114. The operation of the draw-works 130 is known in the art and is thus not described in detail herein.

In one aspect, a suitable drilling fluid 131 (also referred to as "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 provide information about the torque and the rotational speed of the drill string 120. Rate of penetration of the drill string 120 may be determined from the sensor $S_5$, while the sensor $S_6$ may provide the hook load of the drill string 120.

In some applications, the drill bit 150 is rotated by rotating the drill pipe 122. However, in other applications, a downhole motor 155 (mud motor) disposed in the drilling assembly 190 also rotates the drill bit 150. The rate of penetration ("ROP") for a given drill bit and BHA largely depends on the WOB or the thrust force on the drill bit 150 and its rotational speed.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided from a program to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole and may control one or more operations of the downhole and surface devices.

The drilling assembly 190 contains formation evaluation sensors 165 (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation downhole, salt or saline content, and other selected properties of the formation 195 surrounding the drilling assembly 190. Such formation evaluation sensors 165 are generally known in the art. The drilling assembly 190 may further include a variety of other sensors and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.

The drilling assembly may further include a magnetometer 192 for measuring a local magnetic field. The magnetometer 192 may be a three-axis magnetometer for obtaining magnetometer measurements along three orthogonal directions. In an exemplary embodiment, one of the orthogonal directions (i.e., the z-direction) is directed along a longitudinal axis of the drill string and the other orthogonal directions (i.e., the x-direction and y-direction) are in a transverse plane of the drill string and extending radially outward from the drill string. In one embodiment, the magnetometer 192 may measure the local magnetic field to obtain a measurement affected by the presence of a magnetic field on an object in a nearby offset well. These measurements may be sent to controller 140 or other suitable processor that uses the measurements to determine a relative distance between the drill string 120 and the offset well. The drilling assembly may further include survey instruments for obtaining survey parameters, such as borehole inclination and azimuth. In one embodiment, the magnetometer 192 is located proximate drill bit 150, thereby improving the relevancy of obtained measurements with respect to the drill bit location and therefore the accuracy of the drill bit location. The estimated relative distance may be with respect to a sensor, a BHA, a drill bit or other suitable location of the drill string 120.

Figure 2:
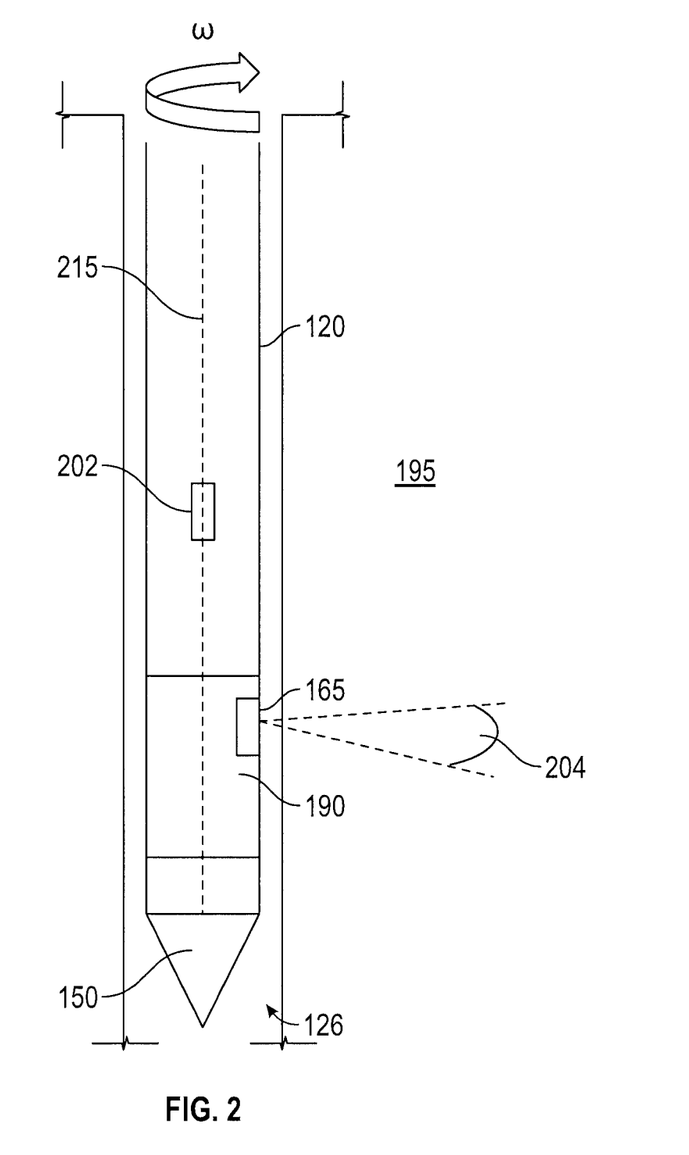
FIG. 2 shows an expanded illustration of the drill string of FIG. 1 in one embodiment of the present invention.

FIG. 2 shows an expanded illustration of the drill string 120 disposed in borehole 126 in one embodiment of the present invention. The drill string 120 includes drill bit 150, drilling assembly 190, and an illustrative formation evaluation sensor 165. As the drill string 120 rotates, the formation sensor 165 sweeps along the circumference of the drill string 120. Therefore, when the formation sensor 165 is operated continuously, formation parameter measurements are obtained over an arc 204 or "pie slice" of the formation 195. It is useful to correctly identify the tool face angle (or "azimuthal angle") at which parameter measurements are taken so that parameter measurements taken during one revolution of the drill string 120 are consistently aligned with parameter measurements taken during another revolution of the drill string 120. The greater the precision in azimuth angle, the greater the precision and alignment of formation parameter measurements for constructing formation image logs. In one embodiment, the tool face angle is determined by measuring the rotation rate at several times and integrating the incremental rotation rate measurements over time to determine an accumulated angle of rotation from a beginning reference angle and thus the instantaneous tool face angle.

Certain formation evaluation sensors 165 have a sensitivity to instantaneous rotation rate. An antenna used as a receiver of a transmitted electromagnetic signal to measure formation resistivity can be affected by a spurious noise signal due to its rotation in the presence of earth's magnetic field. To correct for this error source, the instantaneous rotation rate must be known. Thus it is useful to be able to measure the instantaneous rotation rate of formation evaluation sensors 165 in drilling assembly 190 for at least two reasons: correction of the formation evaluation sensors 165, and proper registration of the measurement with the arc traversed.

Due to various downhole forces, the drill bit 150 and drill string 120 experience unexpected variations in its rotation rate during operation. For example, the drill bit 150 may experience a stick-slip condition in which the drill bit becomes stuck and breaks free. Such conditions cause the drill string 120 to experience large changes in the rotation rate of the drill string 120 over a relatively short time period. The drill string 120 therefore includes a rotation measurement device 202 for measuring an instantaneous or substantially instantaneous rotation rate of the drill string 120. The rotation measurement device 202 includes multiple sensors for obtaining measurements related to rotation rate of the drill string 120 during the quick changes in rotation rate. The rotation measurement device 202 is generally located along a centerline or axis of rotation 215 of the drill string 120. Details of the rotation measurement device 202 are discussed below with respect to FIG. 3.

Figure 3:
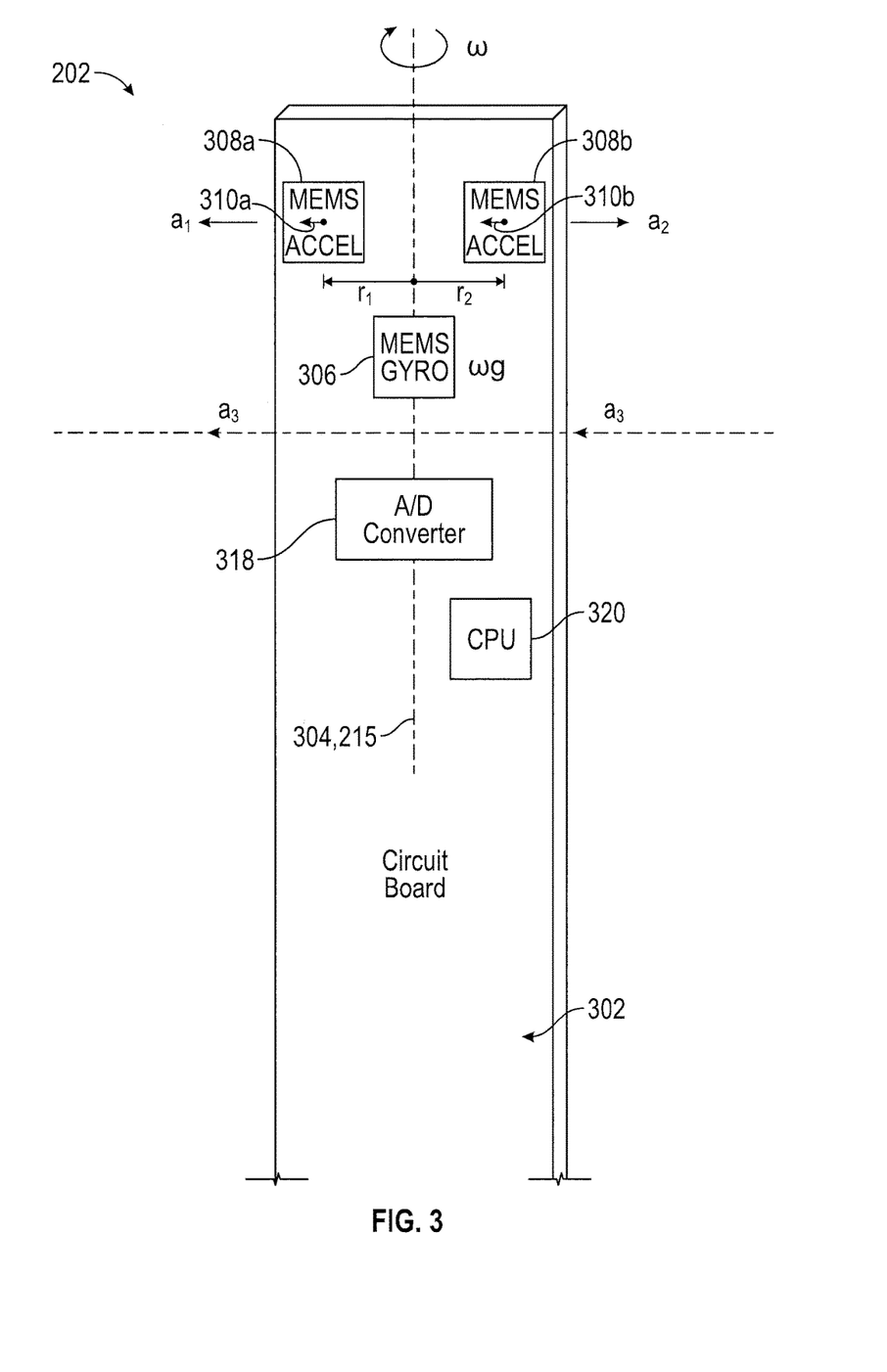
FIG. 3 discloses a detailed view of a rotation measurement device for determining rotation rate of the drill string in one embodiment of the present invention.

FIG. 3 discloses a detailed view of a rotation measurement device 202 for determining rotation rate of the drill string 120 in one embodiment of the present invention. The rotation measurement device 202 is generally secured within drill string 120 and therefore rotates at the same rate as the drill string 120. The rotation measurement device 202 includes a circuit board 302 that includes a centerline 304 that is aligned with the rotational axis 215 of the drill string 120 when the circuit board 302 is installed in the drill string 120. A first sensor (i.e., gyroscope 306) is disposed on the centerline 304 of the circuit board 302. In various embodiments, the gyroscope 306 is a microelectromechanical system (MEMS) gyroscope. The gyroscope 306 measures a first rotation rate $W_g$ of the circuit board 302 and thus of the drill string 120.

The circuit board 302 further includes at least one second sensor (i.e., first accelerometer 308a and second accelerometer 308b) for obtaining acceleration measurements related to rotation rate of the drill string 120. The first accelerometer 308a is located to one side of centerline 304 by a radial distance $r_1$ and the second accelerometer 308b is located on a side of the centerline 304 opposite the first accelerometer 308a. The second accelerometer 308b is located at a second distance $r_2$ from the centerline 304. As the circuit board 302 is generally planar, the first accelerometer 308a and the second accelerometer 308b are 180 degrees apart from each other with respect to the rotational axis 215 of the drill string 120. In various embodiments, the first accelerometer 308a and the second accelerometer 308b are MEMS accelerometers. The first accelerometer 308a and the second accelerometer 308b may have polarities 310a and 310b, respectively, associated with them. As shown in FIG. 3, polarity 310a and polarity 310b are oriented in the same direction (i.e., to the left as shown in FIG. 3). The gyroscope 306, the first accelerometer 308a and the second accelerometer 308b communicate their measurements to a processor 320. In various embodiments, these measurements are passed through an analog/digital converter 318 prior to being received at the processor 320. The processor 320 receives rotation rate $W_g$ directly from gyroscope 306. The processor 320 uses the acceleration measurements from the first accelerometer 308a and the second accelerometer 308b, along with their respective known distances to the centerline 304 ($r_1$, $r_2$), to determine a rotation rate $\omega_a$. The determination of the rotation rate $\omega_a$ is discussed below.

During rotation of the drill string 120 in the borehole 126, the first accelerometer 308a and the second accelerometer 308b are subjected to centrifugal accelerations $a_1$ and $a_2$, respectively due to rotation of the drill string 120 as well as to any lateral acceleration $a_3$ on the drill string 120. Due to the polarity 310a, the first accelerometer 308a measures an acceleration $a_1'$ that is a summation of a rotational acceleration component $+a_1$ and lateral acceleration component $+a_3$. Due to polarity 310b, the second accelerometer 308b measures an acceleration $a_2'$ that is a summation of a rotational acceleration component $-a_2$ and lateral acceleration component $+a_3$. This is shown in Eqs. (1) and (2), $$a_1' = a_1 + a_3 \qquad \text{Eq. (1)}$$

$$a_2' = -a_2 + a_3 \qquad \text{Eq. (2)}$$

The effects of lateral acceleration can be removed by calculating a difference a' between accelerometer measurements, as shown in Eq. (3):

$$a' = \frac{a_1' - a_2'}{2} = \frac{(a_1 + a_3) - (-a_2 + a_3)}{2} = \frac{a_1 + a_2}{2} \qquad \text{Eq. (3)}$$

It is also noted that the centrifugal acceleration a' of the drill string is an average of $a_1'$ and $a_2'$:

It is thus possible to determine the rotation rate $\omega_a$ seen by the accelerometers from:

$$\omega_a = \sqrt{a'/r} \qquad \text{Eq. (4)}$$

The calculations of Eq. (1)-(5) include the assumption that $r_1 = r_2 = r$. However, this is not meant to be a limitation of the invention. Similar calculations can be performed to obtain $\omega_a$ for other configurations of the accelerometers 308a and 308b, including for $r_1 \neq r_2$, for different polarity orientations of accelerometers 308a, 308b, etc. Additionally, the calculations encompass configurations in which the lateral acceleration is not coplanar with circuit board 302.

Once $\omega_g$ or $\omega_a$ have been obtained, the processor 320 selects which of the rotation rates ($\omega_g$ or $\omega_a$) are to be used as the computed final rotation rate $\omega$ of the drill string 120. In one embodiment, processor 320 compares an absolute value of the rotation rate $\omega_g$ to a threshold value $\omega_{g,max}$. When $|\omega_g| \leq \omega_{g,max}$, the gyroscope measurement of rotation rate $\omega_g$ is considered to be more reliable than the accelerometer measurement $\omega_a$ and thus rotation rate $\omega_g$ is selected as the computed final rate $\omega$. When $|\omega_g| > \omega_{g,max}$, the accelerometer measurement $\omega_a$ is considered to be more reliable than the gyroscope measurement of rotation rate $\omega_g$ and thus $\omega_a$ is selected as the computed final rotation rate $\omega$. This selection process is illustrated in FIG. 4.

Figure 4:
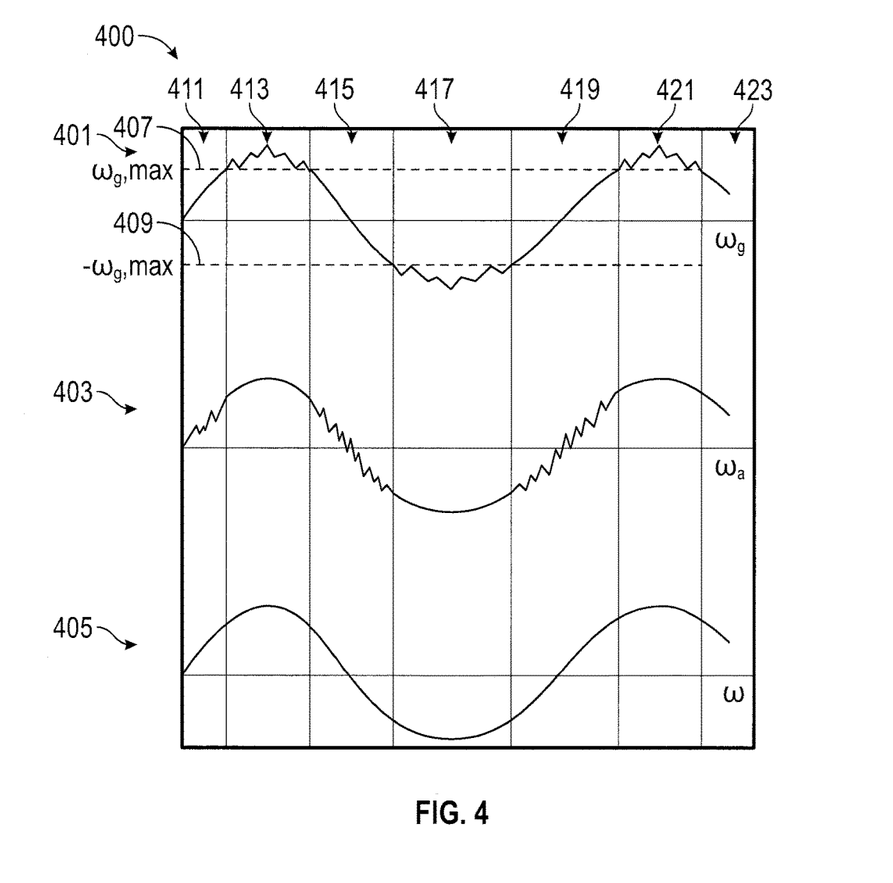
FIG. 4 shows three graphs of rotation rate measurements obtained during operation of the drill string in an exemplary embodiment.

FIG. 4 shows three graphs of rotation rate measurements obtained during operation of the drill string 120 in an exemplary embodiment. The top graph 401 shows rotation rate $\omega_g$ obtained using the gyroscope 306. The rotation rate $\omega_g$ varies in a mostly sinusoidal pattern. This pattern can occur in a borehole with a tight spot that produces an oscillatory rotation rate of the drill string in a moderate stick-slip pattern. A first horizontal line 407 is shown representing the value of $\omega_{g,max}$ and a second horizontal line 409 is shown representing the value of $-\omega_{g,max}$. The value $\omega_{g,max}$ generally is or is related to a maximal rotation rate $\omega_{max,spec}$ specified by the manufacturer, which defines a range of rotation rates over which the gyroscope is considered to be reliable. For example, the manufacturer's specifications may indicate the gyroscope 306 reliably measures rotation rates up to about $\omega_{max,spec} = 1000$ degrees per second. The value of $\omega_{g,max}$ can then be set to 1000 degrees per second. Alternatively, the value of $\omega_{g,max}$ can be set to a selected fraction of $\omega_{max,spec}$, such as 90% of $\omega_{max,spec}$ or 95% of $\omega_{max,spec}$, for example. In FIG. 4, the measurement of $\omega_g$ is shown as becoming clipped or unstable or wildly varying when $\omega_g > \omega_{g,max}$ or when $\omega_g < -\omega_{g,max}$.

The middle graph 403 shows rotation rate $\omega_a$ generated using the first and second accelerometers 308a and 308b. As shown in FIG. 4, the rotation rate $\omega_a$ may be reliable in a range of rotations rotes in which the gyroscope measurement are generally unreliable (i.e., for $|\omega_g| > \omega_{g,max}$. Additionally, the rotation rate $\omega_a$ may be unreliable in a range over which the gyroscope measurements are reliable (i.e., for $|\omega| \leq \omega_{max}$).

The bottom graph 405 shows the computed final rotation rate $\omega$ as determined using the selection step described above. In time periods 411, 415, 419 and 423, (i.e., for time periods in which $|\omega_g| \leq \omega_{max}$) the values of $\omega_g$ are selected as the computed final rotation rate $\omega$. In time periods 413, 417 and 421, (i.e., for time periods in which $|\omega_g| > \omega_{max}$) the values of $\omega_a$ are selected as the computed final rotation rate $\omega$. As a result the computed final rotation rate $\omega$ is smooth and reliable over the entire range of the rotation rates of the drills string.

Figure 5:
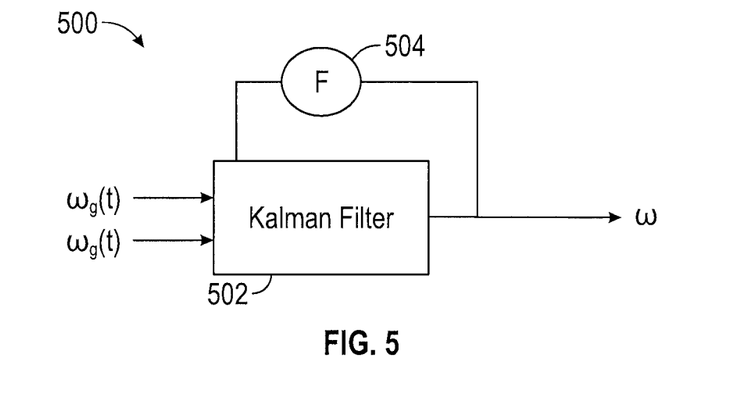
FIG. 5 illustrates a selection method for estimating final computed rotation rate using a Kalman filter.

FIG. 5 illustrates a selection method 500 for estimating final computed rotation rate $\omega$ using a Kalman filter 502. The Kalman filter 502 can be used for time-series analysis of the gyroscopic and accelerometer-determined rotation rates, stated as $\omega_g(t)$ and $\omega_a(t)$, respectively. These rotation rates are provided to the Kalman filter 502 along with state variable F that may be the current rotation rate $\omega$ or a current tool face angle, for example. The Kalman filter 502 employs a weighted average of the rotation rates $\omega_g(t)$ and $\omega_a(t)$ based on a covariance of the rotation rates. The result of the weighted average is a new state estimate (i.e., a new computer final rotation rate $\omega(t)$). The weights are calculated from a covariance of a measure of the measurements This process can be repeated over a plurality of time steps to obtain a rotation rate $\omega(t)$ for a plurality of time steps.

The present disclosure therefore provides various methods for obtaining a final computed rotation rate $\omega$ given $\omega_a$ and $\omega_g$. The rotation rate $\omega$ can then be used for various drilling operations. For example, the rotation rate $\omega$ can be used to provide improved knowledge of tool face angle. In various embodiments, the processor 302 integrates the rotation rate $\omega(t)$ time-series over time to determine a toolface angle $\theta$ of the drill string 120. The improved tool face angle may be used to improve alignment of formation parameter measurements over several rotations of the drill string 120, resulting in improved measurement of formation parameters. For example, a first formation parameter measurement obtained at tool face angle $\theta$ can be aligned or stacked with a second parameter measurement obtained at tool face angle $\theta+360°$. The improved formation parameter measurements may be used with formation models to obtain an improved location of drill string location and therefore an improved geo-steering of the drill string 120.

Figure 6:
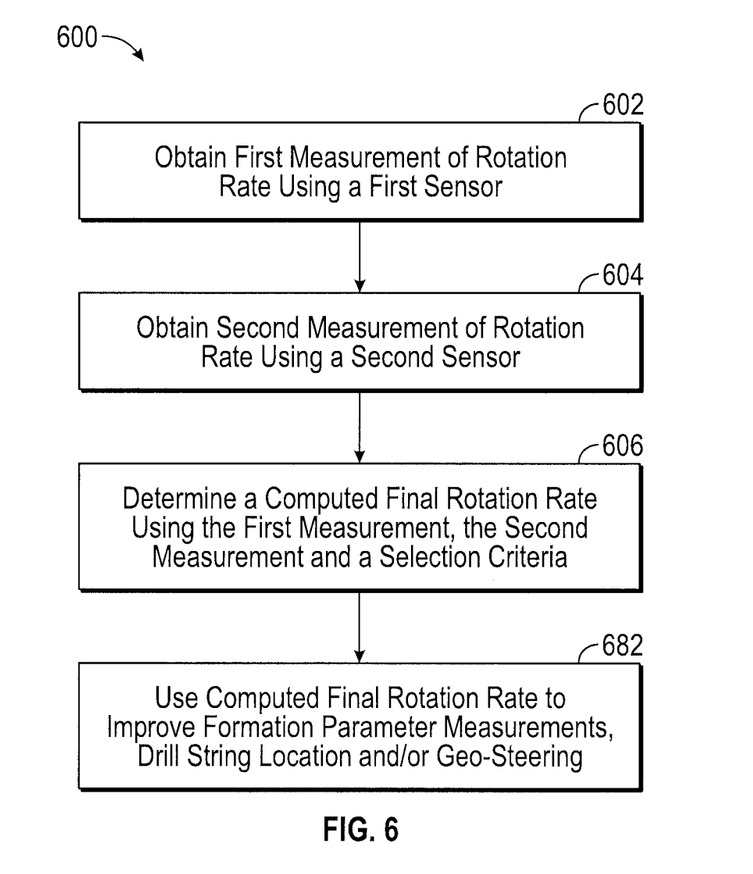
FIG. 6 shows a flowchart illustrating a method of operating a downhole tool in one embodiment of the present disclosure.

FIG. 6 shows a flowchart 600 illustrating a method of operating a downhole tool in one embodiment of the present disclosure. In Box 602, a first sensor (gyroscope 306) obtains a first measurement of rotation rate of the tool $\omega_g$. In Box 604, a second sensor (accelerometer 308a and 308b) are used to obtain a second measurement of rotation rate of the tool $\omega_a$. In Box 606, processor 320 determines a computed final rotation rate (the "estimate of the rotation rate") using one of the selection methods discussed herein. In Box 608, the computed final rotation rate is used to improve formation parameter measurements, drill string location and/or geo-steering.

Figure 7:
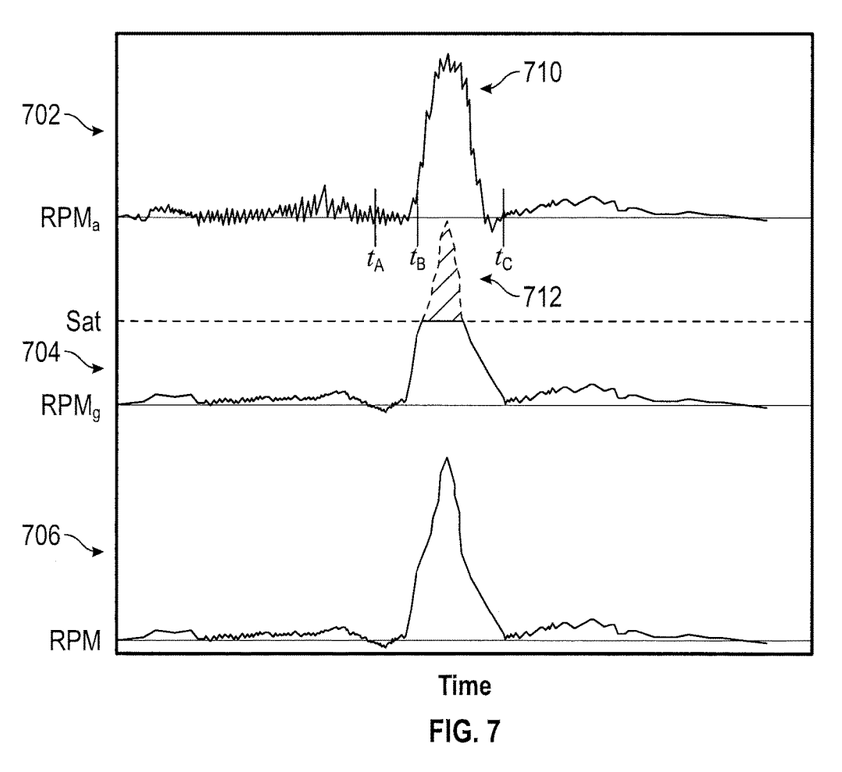
FIG. 7 shows various illustrative graphs of rotation rate for a downhole drill string during a single stick-slip condition.

FIG. 7 shows various graphs of rotation rate measurements for a downhole drill string. The first graph 702 illustrates rotation rate measurements ($RPM_A$) for the drill string obtained using the accelerometer disclosed herein. The second graph 704 illustrates rotation rate measurements ($RPM_G$) for the drill string obtained using the gyroscope disclosed herein. The rotation rate measurements illustrate a scenario in which the drill string experiences a single stick-slip situation. The drill string is freely rotating at given rotation rate up until time $t_A$ and then experiences a stick situation beginning at time $t_A$ at which time the rotation rate decreases. At time $t_B$, the drill string becomes unstuck and the rotation rate increases to a peak 710 before settling back to a freely rotating state at time $t_C$. The accelerometer measurements ($RPM_A$) are susceptible to noise. The gyroscope measurements ($RPM_G$) are less noisy than the accelerometer measurements ($RPM_A$). However, the gyroscope measurements ($RPM_G$) are cut off when they reach a saturation threshold (SAT) as shown on graph 704. Therefore, the portion of the peak 712 of the gyroscope measurements ($RPM_G$) above the saturation threshold (SAT) is not correctly recorded. This error causes an incorrect calculation of tool face angle when using the integration method discussed herein with respect to FIG. 2.

In order to provide a correct calculation of tool face angle, the $RPM_A$ are substituted for $RPM_G$ values for those time periods during which the $RPM_G$ values are equal to or greater than the saturation threshold. The third graph 706 shows a combined rotation rates from the accelerometer measurements of first graph 702 and the gyroscope measurements of second graph 704. The third graph 706 shows a combination of measurements ($RPM_O$) which includes $RPM_G$ measurements for those time periods during which the $RPM_G$ measurements are less than the saturation threshold and $RPM_A$ measurements for those time periods during which the $RPM_G$ measurements are equal to or greater than the saturation threshold. The combined measurements ($RPM_O$) shown in the third graph 706 can be used in subsequent calculations to determine tool face angle using the integration method discussed herein with respect to FIG. 2.

In one aspect, the tool face angle determined by the methods disclosed herein can be used to form an image of the borehole. For example, the determined tool face angle can be used to place measurements taken by formation sensor (165, FIG. 1) at their rotational position with respect to the drill string (120, FIG. 1). Additionally, the determined tool face angle can indicate a direction of drilling for the drill string 120 so that the drill string 120 can be steered in a direction indicated by the determined tool face direction. The drill string 120 may be steered using the current tool face direction determined using the methods herein and the direction of a formation that is indicated by measurements taken by the formation sensor 165 and whose direction may be determined using the methods herein. In another embodiment, the tool face angle determined using the methods herein may be used to correct tool face angle measurements obtained through other methods not disclosed herein. Alternatively, the tool face angle determine using the methods disclose herein may be averaged with other tool face angle measurements. Use of the methods disclosed herein allow an operator to have a constant knowledge of the tool face angle so that the operator does not have to withdraw the drill string 120 to a location at which the tool face angle is previously known.

While the illustrative downhole tool described herein is a drill string, in alternate embodiments, the downhole tool may be any tool or device that experiences a rotation while in a borehole.

Set forth below are some embodiments of the foregoing disclosure:

Embodiment 1: A method of using a tool in a borehole penetrating a formation, comprising: using a gyroscope disposed on the tool to obtain a first measurement of rotation rate of the tool; using at least one accelerometer disposed on the tool to obtain a second measurement of rotation rate of the tool; and using a processor to: generate an estimate of the rotation rate of the tool using at least one of the first measurement of rotation rate and the second measurement of rotation rate, and use the estimate of the rotation rate to determine a rotational position of a formation parameter measurement obtained during rotation of the tool.

Embodiment 2: The method of embodiment 1, wherein the gyroscope is disposed on a rotational axis of the tool and the at least one accelerometer is disposed at a radial distance from the rotational axis.

Embodiment 3: The method of embodiment 1, wherein the gyroscope is a microelectromechanical system (MEMS) gyroscope and the at least one accelerometer includes a MEMS accelerometer.

Embodiment 4: The method of embodiment 1, wherein generating the estimate of the rotation rate further comprises at least one of: (i) comparing the first measurement of rotation rate to a threshold value; and (ii) applying a Kalman filter using the first measurement of rotation rate and the second measurement of rotation rate.

Embodiment 5: The method of embodiment 1, further comprising using the rotational position to align a first formation parameter measurement obtained during a first revolution with a second formation parameter measurement obtained during a second revolution.

Embodiment 6: The method of embodiment 1, further comprising integrating a time-series of the estimate of the rotation rate to obtain the rotational position.

Embodiment 7: The method of embodiment 1, wherein the estimated rotation rate of the tool includes the first measurement of rotation rate for those time periods during which the first measurement of rotation rate is less than a saturation threshold of the first sensor and the second measurement of rotation rate for those time periods during which the first measurement of rotation rate is equal to or greater than the saturation threshold.

Embodiment 8: The method of embodiment 1, further comprising performing geo-steering of the tool in the wellbore in a direction indicated by the determined rotational position of the formation parameter measurement.

Embodiment 9: An apparatus for use in a borehole, comprising: a gyroscope for obtaining a first measurement of a rotation rate of the apparatus; at least one accelerometer for obtaining a second measurement of the rotation rate of the apparatus; and a processor configured to: generate an estimate of the rotation rate using at least one of the first measurement of rotation rate and the second measurement of rotation rate, and use the estimate of the rotation rate to determine a rotational position of a formation parameter measurement obtained during rotation of the apparatus in the borehole.

Embodiment 10: The apparatus of embodiment 9, wherein the gyroscope is disposed on a rotational axis of the apparatus and the at least one accelerometer is disposed at a radial distance from the rotational axis of the apparatus.

Embodiment 11: The apparatus of embodiment 10, wherein the at least one accelerometer includes a first accelerometer disposed at a first radial distance from the rotation axis and a second accelerometer disposed at a second radial distance from the rotation axis opposite the first accelerometer.

Embodiment 12: The apparatus of embodiment 9, which the gyroscope is a microelectromechanical system (MEMS) gyroscope and the at least one accelerometer includes a MEMS accelerometer.

Embodiment 13: The apparatus of embodiment 9, wherein the processor is further configured to generate the estimate of the rotation rate by performing at least one of: (i) comparing the first measurement of rotation rate to a threshold value; and (ii) applying a Kalman filter using the first measurement of rotation rate and the second measurement of rotation rate.

Embodiment 14: The apparatus of embodiment 9, wherein the processor is further configured to use the rotational position to align a first formation parameter measurement obtained during a first revolution of the apparatus with a second formation parameter measurement obtained during a second revolution of the apparatus.

Embodiment 15: The apparatus of embodiment 9, wherein the processor is further configured to integrate a time-series of the estimate of the rotation rate to obtain the rotational position.

Embodiment 16: The apparatus of embodiment 9, wherein the processor is further configured to correct a sensor measurement that is sensitive to errors in rotation rate.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of measuring a rotational position of a sensor in a tool in a borehole penetrating a formation, comprising:
using a gyroscope disposed on the tool to obtain a first measurement of a rotation rate of the tool;
using at least one accelerometer disposed on the tool to obtain a second measurement of the rotation rate of the tool; and using a processor to:
 generate an estimate of the rotation rate of the tool using the first measurement of the rotation rate and the second measurement of the rotation rate, wherein the estimate of the rotation rate of the tool includes the first measurement of the rotation rate for those time periods during which the first measurement of the rotation rate is less than a threshold of the gyroscope and the second measurement of the rotation rate for those time periods during which the first measurement of the rotation rate is equal to or greater than the threshold, and
 use the estimate of the rotation rate to determine the rotational position of the sensor during rotation of the tool.

2. The method of claim 1, wherein the gyroscope is disposed on a rotational axis of the tool and the at least one accelerometer is disposed at a radial distance from the rotational axis.

3. The method of claim 1, wherein the gyroscope is a microelectromechanical system (MEMS) gyroscope and the at least one accelerometer includes a MEMS accelerometer.

4. The method of claim 1, wherein generating the estimate of the rotation rate further comprises at least one of: (i) comparing the first measurement of the rotation rate to a threshold value; and (ii) applying a Kalman filter using the first measurement of the rotation rate and second measurement of the rotation rate.

5. The method of claim 1, further comprising using the determined rotational position to align a first formation parameter measurement obtained during a first revolution with a second formation parameter measurement obtained during a second revolution.

6. The method of claim 1, further comprising integrating a time-series of the estimate of the rotation rate to determine the rotational position.

7. The method of claim 1, further comprising performing geo-steering of the tool in the borehole in a direction indicated by the determined rotational position of the sensor.

8. The method of claim 1, wherein the at least one accelerometer further comprises a first accelerometer that measures a first acceleration that includes a lateral acceleration component and a second accelerometer that measures a second acceleration that includes the lateral acceleration component, further comprising calculating a difference between the first acceleration and the second acceleration to remove the lateral acceleration component.

9. An apparatus for use in a borehole, comprising:
 a gyroscope for obtaining a first measurement of a rotation rate of the apparatus;
 at least one accelerometer for obtaining a second measurement of the rotation rate of the apparatus; and
 a processor configured to:
 generate an estimate of the rotation rate using the first measurement of the rotation rate and the second measurement of the rotation rate, wherein the estimate of the rotation rate includes the first measurement of the rotation rate for those time periods during which the first measurement of the rotation rate is less than a threshold of the gyroscope and the second measurement of the rotation rate for those time periods during which the first measurement of the rotation rate is equal to or greater than the threshold, and
 use the estimate of the rotation rate to determine a rotational position of the apparatus during rotation of the apparatus in the borehole.

10. The apparatus of claim 9, wherein the gyroscope is disposed on a rotational axis of the apparatus and the at least one accelerometer is disposed at a radial distance from the rotational axis of the apparatus.

11. The apparatus of claim 10, wherein the at least one accelerometer includes a first accelerometer disposed at a first radial distance from the rotational axis and a second accelerometer disposed at a second radial distance from the rotational axis opposite the first accelerometer.

12. The apparatus of claim 9, wherein the gyroscope is a microelectromechanical system (MEMS) gyroscope and the at least one accelerometer includes a MEMS accelerometer.

13. The apparatus of claim 9, wherein the processor is further configured to generate the estimate of the rotation rate by performing at least one of: (i) comparing the first measurement of the rotation rate to a threshold value; and (ii) applying a Kalman filter using the first measurement of the rotation rate and the second measurement of the rotation rate.

14. The apparatus of claim 9, wherein the processor is further configured to use the determined rotational position to align a first formation parameter measurement obtained during a first revolution of the apparatus with a second formation parameter measurement obtained during a second revolution of the apparatus.

15. The apparatus of claim 9, wherein the processor is further configured to integrate a time-series of the estimate of the rotation rate to determine the rotational position.

16. The apparatus of claim 9, wherein the processor is further configured to correct a sensor measurement that is sensitive to errors in the rotation rate.

* * * * *